(12) United States Patent
Wang et al.

(10) Patent No.: US 7,304,446 B2
(45) Date of Patent: Dec. 4, 2007

(54) SENSORLESS AND BRUSHLESS DC MOTOR

(75) Inventors: Wei-Ben Wang, Guangdong (CN);
Wun-Chang Shih, Guangdong (CN);
Ching-Hsing Huang, Guangdong (CN);
Chien-Long Hong, Guangdong (CN);
Chiung-Mei Wang, Guangdong (CN);
Chin-Jung Chen, Guangdong (CN);
Hsiang-Ho Huang, Guangdong (CN);
Huan-Chao Lin, Guangdong (CN);
Hsien-Sheng Pei, Guangdong (CN)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 83 days.

(21) Appl. No.: 11/306,259

(22) Filed: Dec. 21, 2005

(65) Prior Publication Data

US 2006/0197479 A1   Sep. 7, 2006

(30) Foreign Application Priority Data

Feb. 4, 2005   (TW) .............................. 94103787 A (51) Int. Cl.
*H02P 7/06* (2006.01)

(52) U.S. Cl. ...................... 318/254; 318/439; 318/747; 318/138; 310/68 B (58) Field of Classification Search ................ 318/245, 318/254, 439, 747; 310/67 R, 68 B, 186
See application file for complete search history.

(56) References Cited

U.S. PATENT DOCUMENTS

| | | | |
|---|---|---|---|
| 3,641,467 A * | 2/1972 | Ringland et al. .............. 336/5 |
| 3,705,343 A * | 12/1972 | Ringland et al. ............ 323/348 |
| 4,450,396 A * | 5/1984 | Thornton ..................... 318/721 |
| 4,458,184 A * | 7/1984 | Kawate ....................... 318/254 |
| 4,459,087 A * | 7/1984 | Barge .......................... 417/356 |
| 4,687,961 A * | 8/1987 | Horber ....................... 310/186 |
| 4,717,898 A * | 1/1988 | Cappelli ..................... 333/137 |
| 4,928,043 A | 5/1990 | Plunkett |
| 5,216,343 A * | 6/1993 | Genheimer et al. .... 318/568.18 |
| 5,329,195 A * | 7/1994 | Horber et al. ............ 310/68 B |
| 5,418,416 A * | 5/1995 | Muller ........................ 310/186 |
| 5,708,337 A * | 1/1998 | Breit et al. .................. 318/439 |
| RE36,168 E * | 3/1999 | von der Heide et al. . 310/67 R |
| 5,909,072 A * | 6/1999 | Muller ...................... 310/68 B |
| 5,912,521 A * | 6/1999 | Ray ....................... 310/156.06 |
| 5,925,948 A * | 7/1999 | Matsumoto ............... 310/67 R |
| 6,100,618 A * | 8/2000 | Schoeb et al. ............. 310/90.5 |
| 6,218,749 B1 * | 4/2001 | Nondahl et al. .......... 310/68 C |
| 6,686,761 B2 * | 2/2004 | Pan et al. .................... 324/772 |

(Continued)

*Primary Examiner*—Paul Ip
(74) *Attorney, Agent, or Firm*—Winston Hsu (57) ABSTRACT

A sensorless and brushless motor is disclosed including a stator, a rotor, a control circuit and an induction coil (50). The stator includes a stator core (30) and a stator coil (34) wound around the stator core. The rotor includes a rotor magnet (40). The control circuit is electrically connected with the stator coil for controlling a current energizing the stator coil. The induction coil is mounted to the stator and electrically connected with the control circuit. When the rotor rotates, the induction coil is capable of outputting a signal to the control circuit and in response to the signal, the control circuit is capable of changing a direction of the current flowing in the stator coil. Thus, the commutation control for the stator coil is performed by the induction coil and the conventional Hall sensor is eliminated.

10 Claims, 9 Drawing Sheets

U.S. PATENT DOCUMENTS

| | | | |
|---|---|---|---|
| 6,888,282 B2* | 5/2005 | Ahn et al. | 310/179 |
| 2002/0097066 A1* | 7/2002 | Pan et al. | 324/772 |
| 2002/0113519 A1* | 8/2002 | Brown | 310/254 |
| 2004/0080237 A1* | 4/2004 | Han et al. | 310/266 |
| 2004/0174082 A1* | 9/2004 | Graham | 310/156.12 |
| 2005/0189902 A1* | 9/2005 | Iotti | 318/747 |
| 2006/0119352 A1* | 6/2006 | Nishimura | 324/207.25 |
| 2006/0186846 A1* | 8/2006 | Lassen | 318/439 |

\* cited by examiner

SENSORLESS AND BRUSHLESS DC MOTOR

FIELD OF THE INVENTION

The present invention relates generally to direct current (DC) motors, and more particularly to a sensorless and brushless DC motor that does not require the use of Hall sensors.

DESCRIPTION OF RELATED ART

Many types of electrical motors are known. All electrical motors have a stator and a moving component. In rotary motors the moving component is called a "rotor". Currently, electrical motors have been widely used as fan motors, disk drive motors, or the like. For example, if the electrical motor is used in an electrical fan, the electrical motor is applied to drive fan blades of the electrical fan to rotate and accordingly produce an airflow applicable for cooling heat-generating components.

Figure 6:
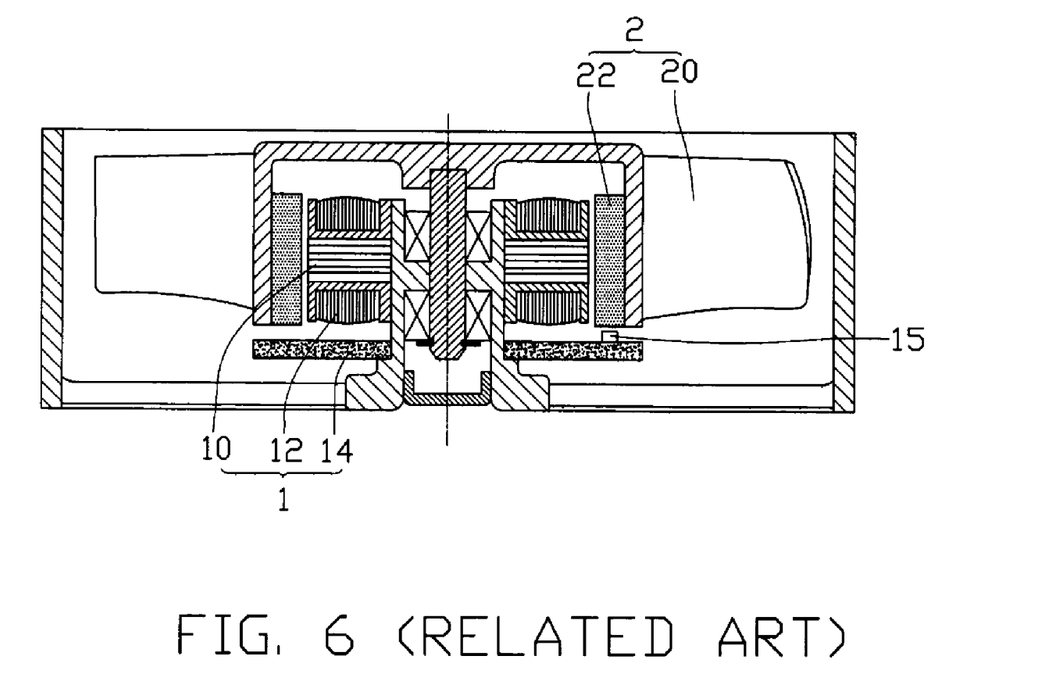
FIG. 6 is a cross-sectional view of an electrical fan in accordance with the conventional art.

FIG. 6 shows a conventional brushless rotary motor used as an electrical fan motor. The rotary motor includes a stator 1 and a rotor 2 rotatably mounted with respect to the stator 1. The stator 1 includes a plurality of laminated silicon steel sheets 10, a stator coil 12 wound around these sheets 10 and a printed circuit board (PCB) 14 having a control circuit (not shown) mounted thereon for driving and controlling the rotary motor. The rotor 2 includes an impeller 20 adapted for producing an airflow and a permanent magnet 22 attached to the impeller 20 and surrounding the stator 1. Mounted on the PCB 14 is a device 15 for detecting the rotational position of the rotor 2. In most cases, the device 15 is a Hall sensor. The Hall sensor 15 is located corresponding to the rotor magnet 22.

Figure 7:
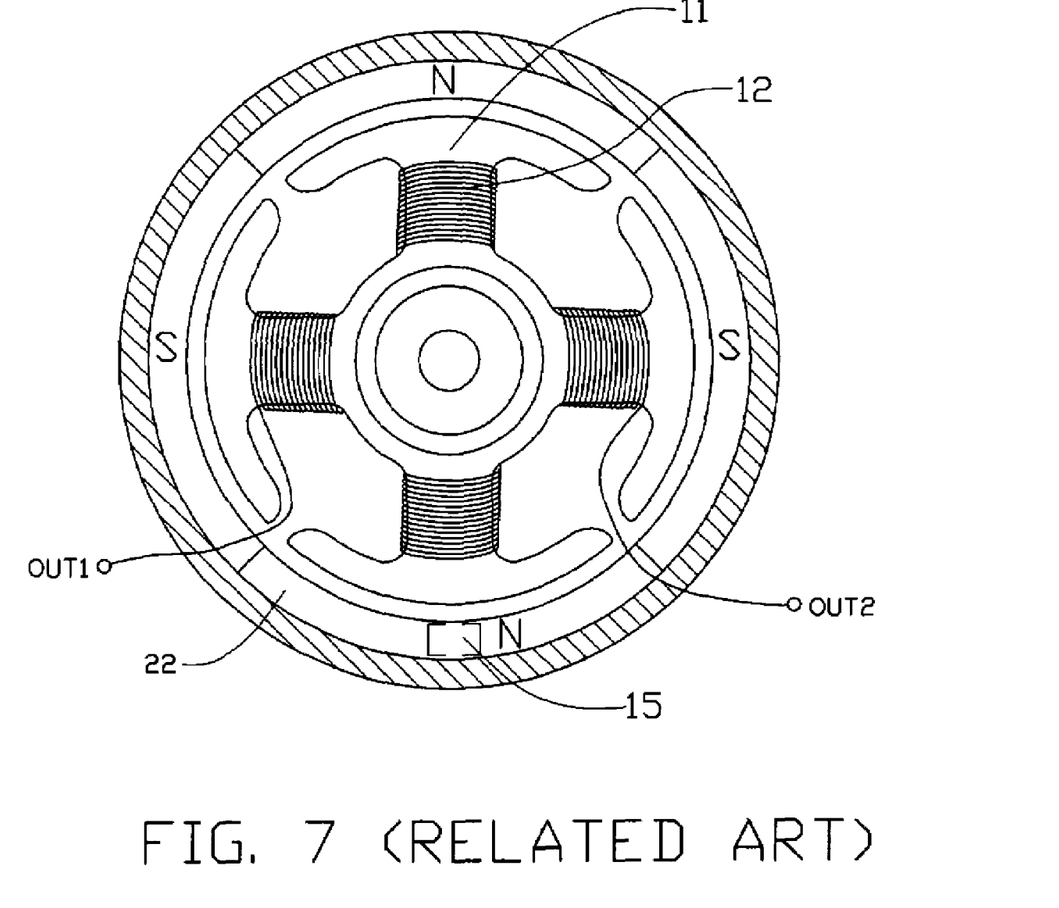
FIG. 7 is a top plan view of a motor of the electrical fan of FIG. 6.

Referring also to FIG. 7, the stator 1 has four extension arms 11 spaced evenly from each other. Each of the extension arms 11 is comprised of the laminated silicon steel sheets 10 with the stator coil 12 being wrapped therearound. Before attached to the impeller 20, the rotor magnet 22 is previously magnetized so that alternating north (N) and south (S) magnetic poles are induced along a circular direction of the rotor magnet 22. The stator coil 12 has a pair of terminals OUT1, OUT2 for being electrically connected to the control circuit of the PCB 14, which energizes the stator 1. After the stator 1 is energized, the stator 1 and the rotor magnet 22 of the rotor 2 are brought into a magnetic interaction, whereby the rotor 2 rotates.

Figure 8:
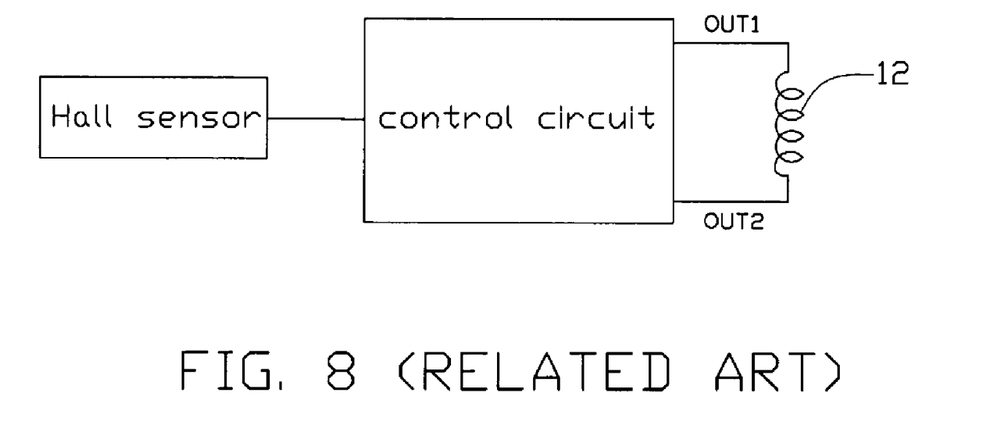
FIG. 8 is a block diagram showing the commutation control system for the motor of FIG. 7.
Figure 9:
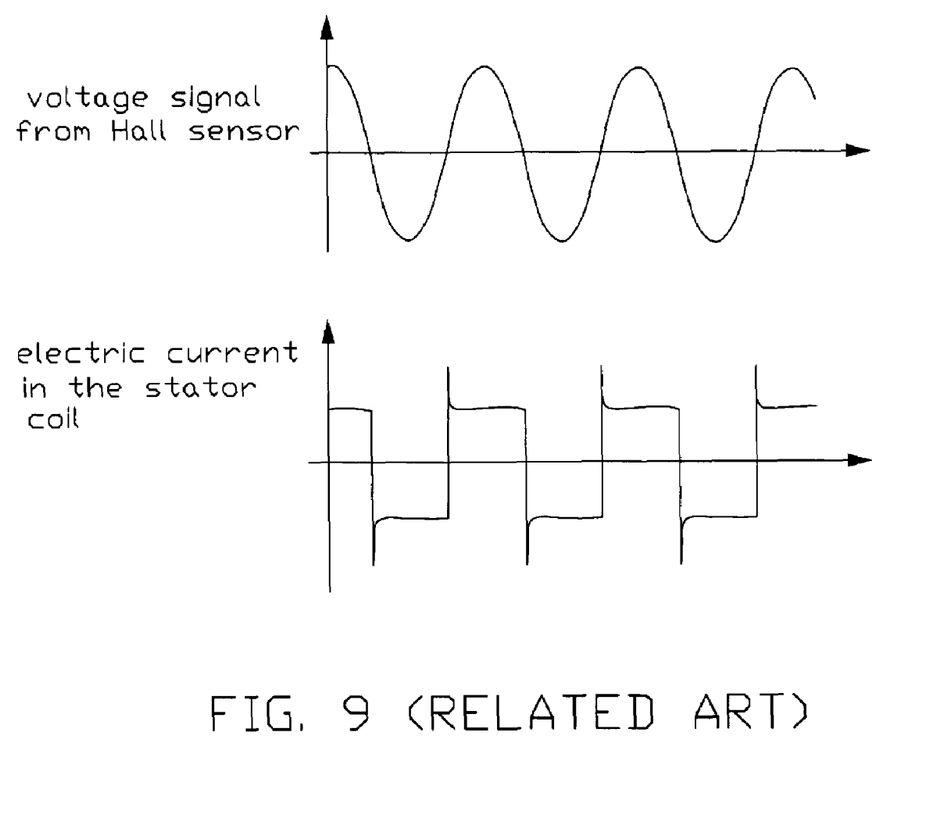
FIG. 9 is a graph showing the voltage and current waveforms when a Hall sensor is used to perform the commutation control for the motor of FIG. 7.

In order to maintain the rotation of the rotor 2 continuously, electric current flowing in the stator coil 12 must be changed. The process of current switching for the stator coil 12 is called "commutation". With reference particularly to FIG. 8, the Hall sensor 15 mounted in the rotary motor is served to help change of the direction of electrical current flowing in the stator coil 12. Specifically, the Hall sensor 15 detects the rotational position of the rotor 2 firstly. When a magnetic north pole or south pole of the rotor magnet 22 is approaching, the Hall sensor 15 sends a signal to the control circuit of the PCB 14. Typically, the signal generated by the Hall sensor 15 is a voltage signal in the form of sine wave including alternating positive and negative voltage outputs, as shown in FIG. 9. When the control circuit receives a positive voltage output from the Hall sensor 15, the control circuit energizes the stator coil 12 with an electric current of one direction. To the contrary, when the control circuit receives a negative voltage output from the Hall sensor, the control circuit energizes the stator coil 12 with an electric current of opposing direction. Thus, commutation of currents flowing in the stator coil 12 is performed by the control circuit in response to the signal from the Hall sensor 15.

Although the Hall sensor 15 satisfies the direction-changing task for currents flowing in the stator coil 12, the use of the Hall sensor has some disadvantages. For example, in order to accurately detect the rotational position of the rotor 2, the Hall sensor 15 is required to be mounted in the rotary motor directly below the rotor magnet 22, whereby the Hall sensor 15 is typically positioned on the PCB 14. However, as electrical motors are made to have a smaller size due to the current trend towards miniaturization, it is become more and more difficult to find a certain mounting area within the rotary motor for accommodating such Hall sensor and the PCB 14.

Furthermore, the PCB 14 mounted under the impeller 20 protrudes outwardly and often blocks a portion of a passage for the airflow generated by the impeller 20. Thus, it is preferred to mount the PCB 14 outside the electrical fan. However, in order to detect the rotational position of the rotor 2, the Hall sensor is required to be mounted at a position corresponding to the rotor 2. On this basis, the PCB 14 on which the Hall sensor is mounted is also required to be installed in the electrical fan. Moreover, the Hall sensor generally has a working temperature range not exceeding 150 degrees centigrade. Thus, electrical motors incorporating Hall sensors are inapplicable in many applications.

In view of the drawbacks in use of Hall sensors, a technique of driving an electrical motor without using any Hall sensor has been proposed. In this technique, a back electromotive force (BEMF) generated by the stator coil during the motor rotation is used as a commutation signal by which the commutation for currents flowing in the stator coil is performed. An example of such a sensorless and brushless motor adopting this technique is described in U.S. Pat. No. 4,928,043. However, in this situation, additional circuits are generally required to drive the sensorless motor, which adds cost to PCB design.

Therefore, it is desirable to provide an electrical motor which overcomes the foregoing disadvantages.

SUMMARY OF INVENTION

The present invention relates to a sensorless and brushless motor applicable as a fan motor, disk drive motor or the like. The motor includes a stator, a rotor, a control circuit and an induction coil. The stator includes a stator core and a stator coil wound around the stator core. The rotor includes a rotor magnet. The control circuit is electrically connected with the stator coil for controlling a current energizing the stator coil. The induction coil is mounted to the stator and electrically connected with the control circuit. When the rotor rotates, the induction coil is capable of outputting a signal to the control circuit and in response to the signal, the control circuit is capable of changing a direction of the current energizing the stator coil. Thus, the commutation control for the stator coil is performed by the induction coil and the conventional Hall sensor is eliminated. By such design, a printed circuit board (PCB) on which the control circuit is mounted can be positioned outside the motor to further reduce the size of the motor. Moreover, the PCB can be mounted outside a device incorporating the motor to miniaturize the device.

Other advantages and novel features of the present invention will become more apparent from the following detailed description of preferred embodiment when taken in conjunction with the accompanying drawings, in which:

DETAILED DESCRIPTION

Figure 1:
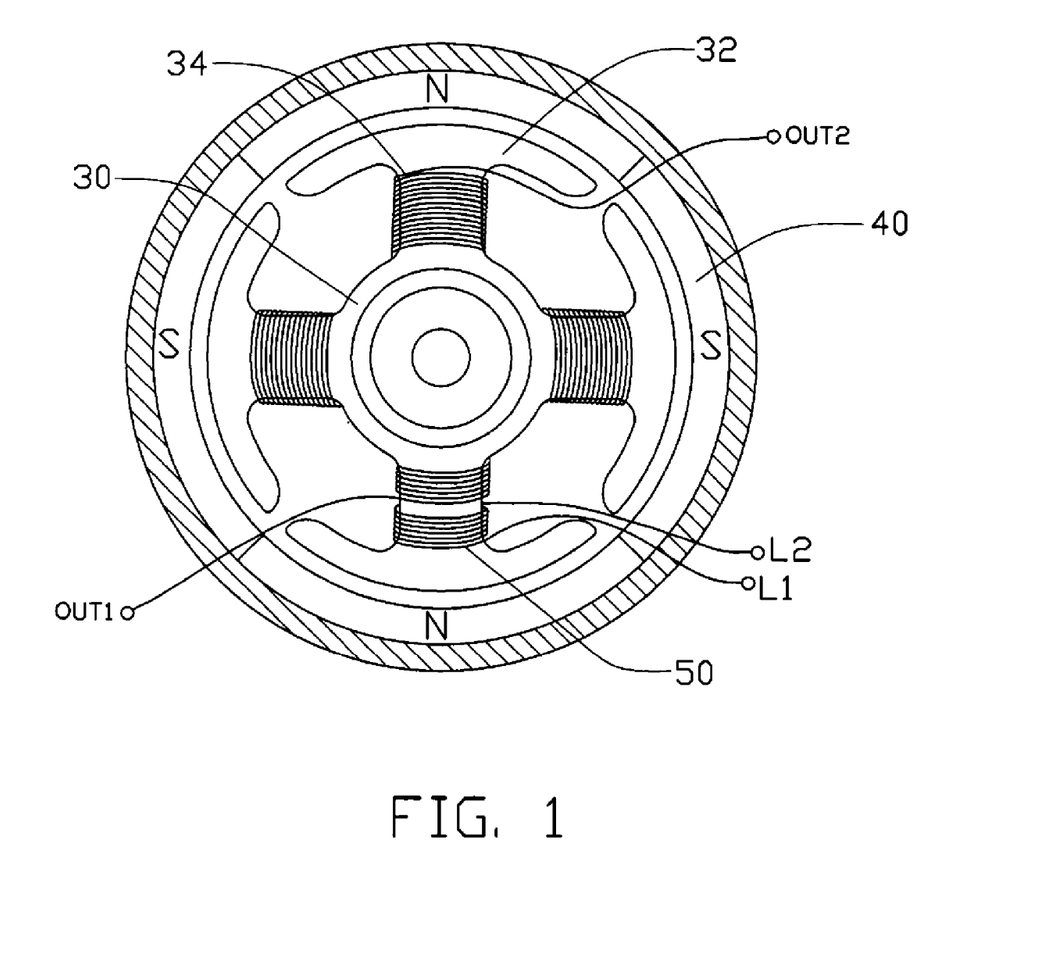
FIG. 1 is a top plan view of a sensorless and brushless motor in accordance with one embodiment of the present invention.

For simplicity, description of embodiments of the present invention is based on rotary motors, although the present invention is not limited to this. FIG. 1 illustrates a brushless and sensorless rotary motor in accordance with one embodiment of the present invention. The motor may be used as a fan motor, a disk drive motor or the like. The motor includes a stator and a rotor rotatably mounted with respect to the stator. The stator includes a stator core 30. The stator core 30 has four extension arms 32 extending from a central portion thereof. Typically, each of the extension arms 32 has a lamination structure comprised of a plurality of laminated silicon steel sheets. A stator coil 34 is wound around these extension arms 32. The stator coil 34 has two terminals OUT1, OUT2 which are to be connected to a control circuit on a printed circuit board (PCB) (not shown). The control circuit is for energizing the stator. The control circuit is electrically connected with the stator coil 34 and controls a current for energized the stator coil 34. The rotor includes a rotor magnet 40 disposed around a circumference of the stator with a small gap formed therebetween. The rotor magnet 40 is previously magnetized to form a plurality of alternating north and south magnetic poles. After the stator coil 34 is energized, a magnetic field is generated around each of the extension arms 32. As a result, the stator and the rotor magnet 40 are brought into a magnetic interaction, whereby the rotor rotates. In application, the rotor magnet 40 is attached to an object which is to be rotated such as an impeller of an electrical fan.

In order to detect the rotational position of the rotor, an induction coil 50 is adopted, which is wound around one of the extension arms 32 of the stator core 30. The induction coil 50 has two terminals L1, L2 which are to be electrically connected with the control circuit. The induction coil 50 is used to substitute the conventional Hall sensor to perform commutation control for the stator coil 34.

Figure 2:
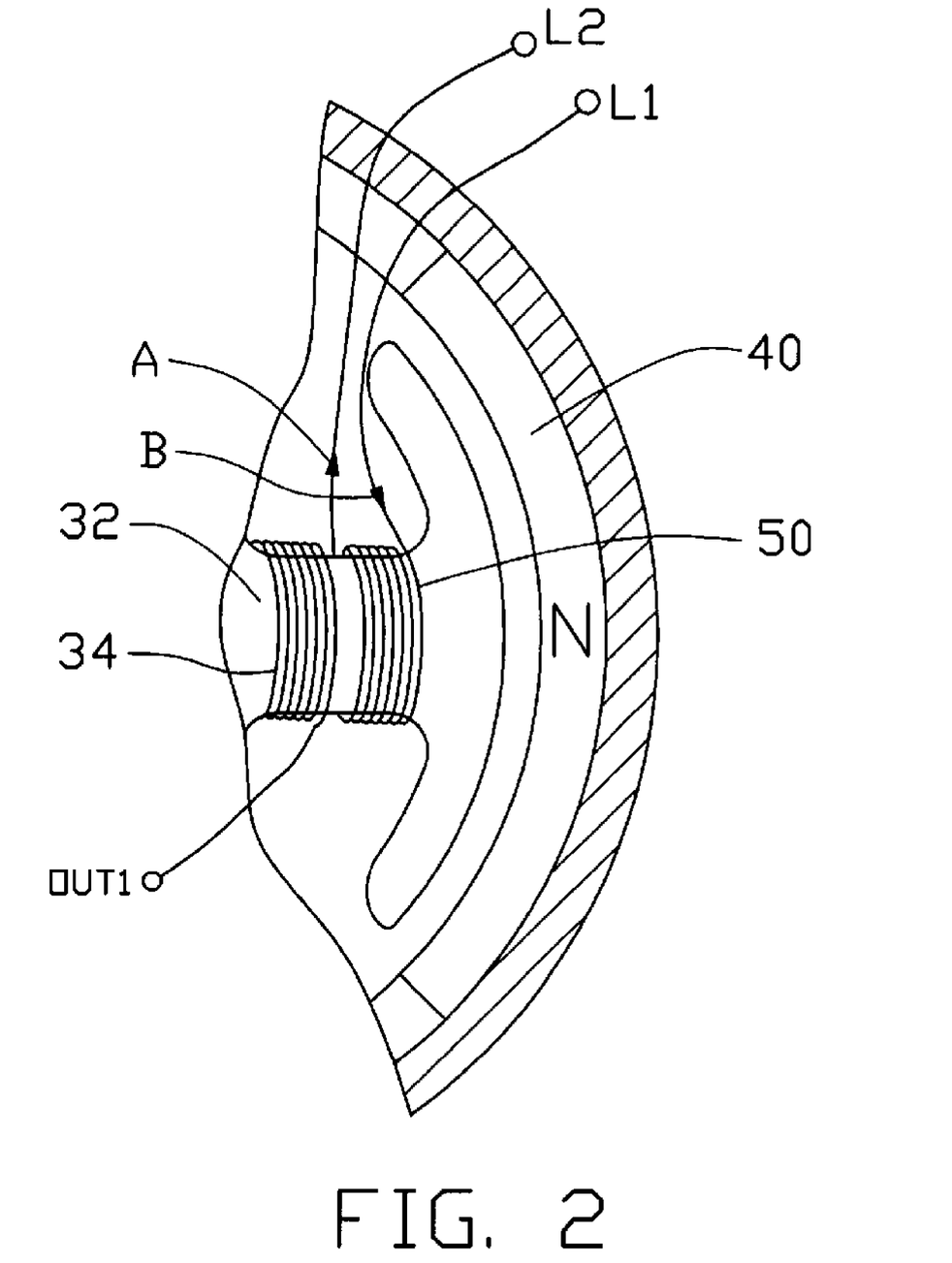
FIG. 2 is an enlarged view of a portion of the motor of FIG. 1.
Figure 3:
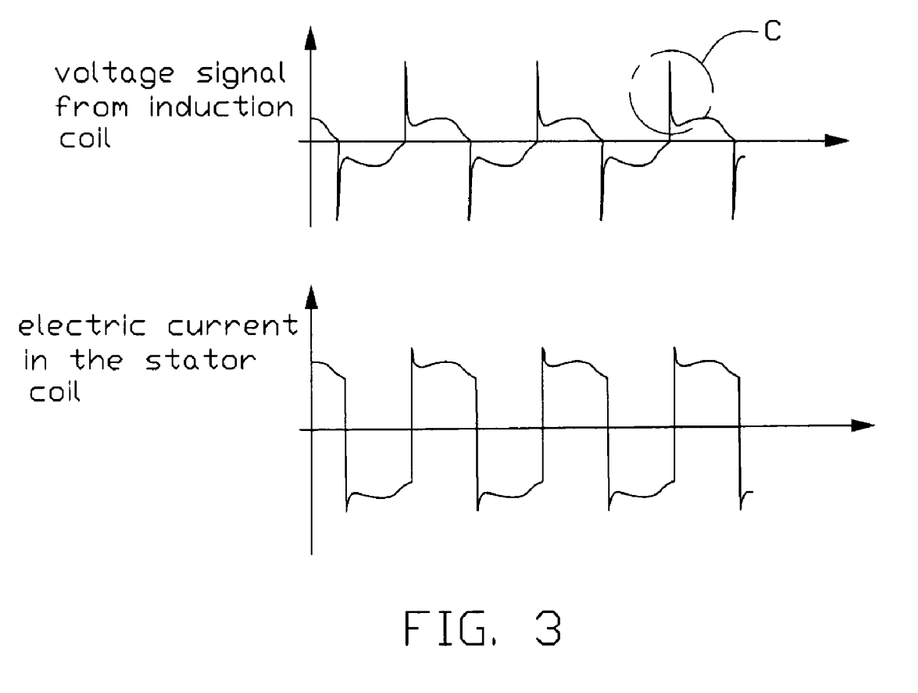
FIG. 3 shows two graphs, wherein one is related to a voltage waveform of an induction coil, and the other is related to a current waveform of a stator coil of the brushless motor of FIG. 1 when the motor is in use.

The principle of operation of the induction coil 50 will become more apparent from FIGS. 2-3. FIG. 2 shows a portion of FIG. 1 in an enlarged scale, showing that a magnetic north pole of the rotor magnet 40 has approached the extension arm 32 on which the induction coil 50 is wound. As the magnetic north pole approaches the extension arm 32, an induced electromotive force (e) is generated in the induction coil 50 due to a magnetic interaction involved, based on the relationship $e=N*d\phi/dt$. In the above-mentioned equation, the symbol N represents the number of turns of the induction coil 50 and the symbol $\phi$ represents the magnetic flux through the induction coil 50. It can be seen from the equation (a) that if the induction coil 50 has more turns and/or the rotor magnet 40 rotates in a faster speed, the generated electromotive force (e) will be larger. The induced electric current in the induction coil is shown in the direction of arrows A and B.

As the rotor rotates further, an adjacent magnetic south pole of the rotor magnet 40 will approach the extension arm 32 on which the induction coil 50 is wound. As the magnetic south pole is approaching, another electromotive force (e) having the opposing direction of current will be induced in the induction coil 50. Thus, as the rotor rotates continuously, the induction coil 50 is induced to output alternating positive and negative voltages, as shown in FIG. 3.

In the waveform shown in FIG. 3, there is a spike voltage among the output voltages of the induction coil 50, as indicated by the circled portion C. This is caused by a magnetic interaction between the rotor magnet 40 and the stator. As described above, when the magnetic north pole of the rotor magnet 40 approaches the extension arm 32, the induction coil 50 is induced to generate a first electromotive force (e1) based on the relationship $e1=N*d\phi/dt$ in view of Faraday's Law. Then, as the adjacent magnetic south pole of the rotor magnet 40 is successively approaching following the magnetic north pole, the induction coil 50 will be induced to produce a second electromotive force (e2) based on the relationship $e2=-N*d\phi/dt$ in view of Lenz's Law. On this basis, as the magnetic pole of the rotor magnet 40 facing the extension arm 32 is changing from N to S or from S to N, the induction coil 50 at that moment will output an electromotive force (e) based on the following relationship $e=e1-e2=(N*d\phi/dt)-(-N*d\phi/dt)=2*N*d\phi/dt$. That is the reason the spike voltage exists. However, this spike voltage will only exist in a very short period of time. In the motor, the electromotive force outputted by the induction coil 50 is used as a control signal only. So long as the induction coil 50 is capable of outputting alternating positive and negative voltages, this spike voltage, however, has no adverse effect for the commutation control for the motor.

In operation, when the magnetic north pole of the rotor magnet 40 is approaching the extension arm 32, the induction coil 50 outputs a positive voltage which informs the control circuit mounted on the PCB to energize the stator coil 34 with an electric current of one direction. After that, when the adjacent magnetic south pole of the rotor magnet 40 is approaching the extension arm 32, the induction coil 50 outputs a negative voltage which informs the control circuit to energize the stator coil 34 with an electric current of opposing direction. In other words, as the rotor magnet 40 rotates, the induction coil 50 is capable of detecting the rotational position of the rotor and accordingly sending a voltage signal to the control circuit, which then energizes the stator coils 34 with an electric current of a predetermined direction according to the received voltage signal.

In the present brushless and sensorless motor, the commutation of currents flowing in the stator coil 34 is performed by the induction coil 50 in connection with the control circuit of the PCB. As a result, the conventional Hall sensor used for this purpose can be completely eliminated. Meanwhile, the control circuit used to energize the stator coil 34 is kept unchanged and is not required to be designed anew. The total cost for the motor is reduced.

Figure 4:
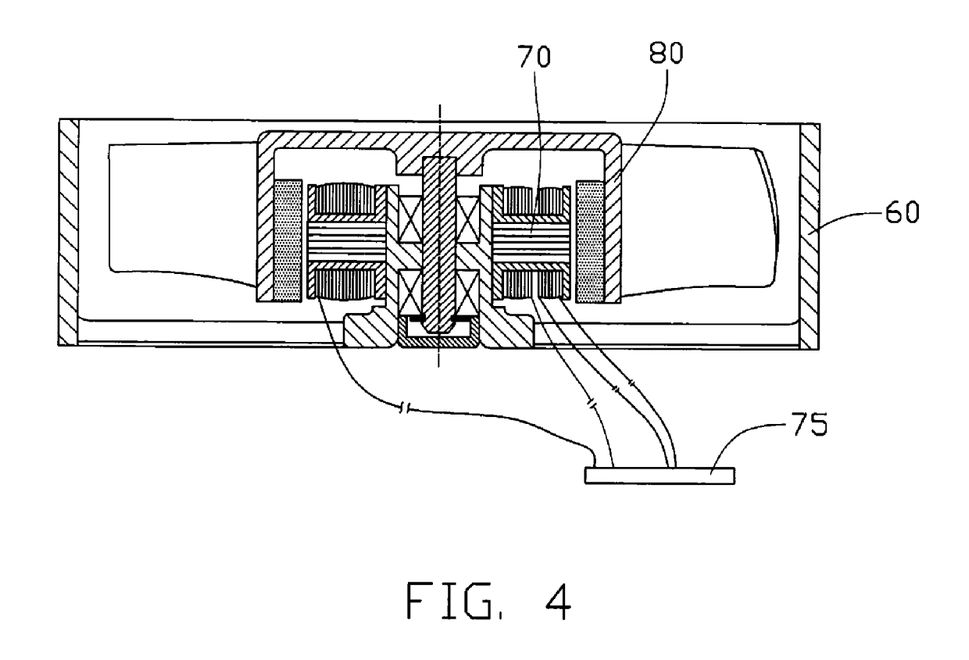
FIG. 4 is a cross-sectional view of an electrical fan embodying the motor of FIG. 1.

FIG. 4 illustrates an example of an application of the motor to an electrical fan. The electrical fan includes an outer housing 60 defining therein a cavity, and a stator 70 and a rotor 80 both of which are installed in the cavity of the housing 60 with the rotor 80 surrounding a circumference of the stator 70. Since the conventional Hall sensor is not required, the PCB 75 with the control circuit energizing the stator 70 mounted thereon is thus capable of be disposed separately from the motor. As shown in this figure, the PCB 75 is disposed outside the electrical fan. The PCB 75, which has the control circuit used for energizing the stator 70, may be incorporated into, for example, a motherboard of a computer system. On this basis, the electrical fan itself can stand without a PCB. Accordingly, the size of the motor and the electrical fan can be reduced.

Figure 5:
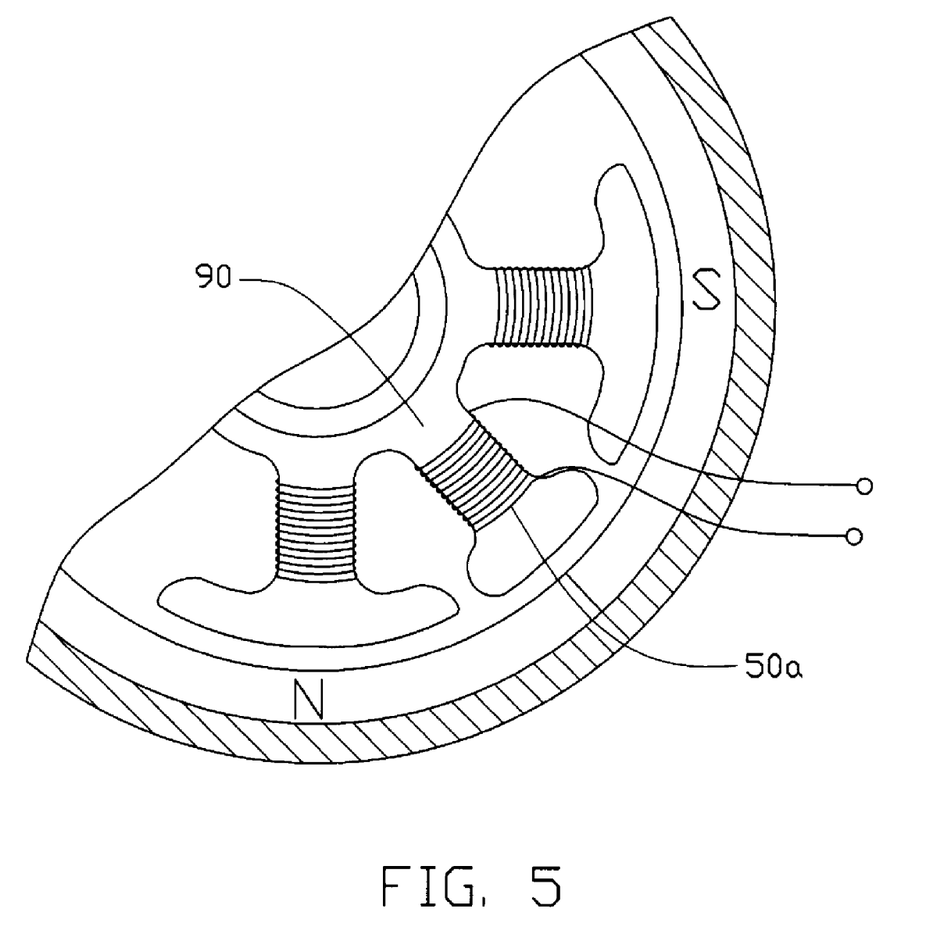
FIG. 5 is a top plan view partially showing a sensorless and brushless motor in accordance with an alternative embodiment of the present invention.

FIG. 5 illustrates a sensorless and brushless DC motor in accordance with an alternative embodiment of the present invention. In this embodiment, the stator core of the motor further includes an additional extension arm 90 extending from a central portion thereof and disposed between two adjacent, originally existed extension arms 32. The induction coil 50a is wound around the additional extension arm 90 for performing the commutation control for the stator coil wound around the extension arms 32 in a similar manner as described above.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sensorless and brushless motor comprising:
   a stator including a stator core and a stator coil wound around the stator core;
   a rotor including a rotor magnet, the rotor magnet being for having a magnetic interaction with the stator core so that the rotor can have a rotation relative to the stator;
   a control circuit being electrically connected with the stator coil for controlling a current energizing the stator coil; and
   an induction coil would around the stator core and electrically connected with the control circuit, the induction coil being for being induced by the rotor magnet to produce a voltage indicating the control circuit a position of the rotor;
   wherein the induction coil is capable of outputting a signal to the control circuit and in response to the signal, the control circuit is capable of changing a direction of the current in the stator coil; and
   wherein the control circuit is mounted on a printed circuit board and the printed circuit board is disposed outside the motor.

2. The motor of claim 1, wherein the stator core has a plurality of extension arms extending from a central portion thereof, the stator coil is wound around the extension arms and the induction coil is wound around one of the extension arms.

3. The motor of claim 1, wherein the stator core has a plurality of extension arms extending from a central portion thereof, the induction coil is wound around one of the extension arms and the stator coil is wound around the other extension arms other than the extension arm on which the induction coil is wound.

4. An electrical fan comprising:
   a stator including a stator coil electrically connected to a control circuit, the control circuit controlling a current for energizing the stator coil;
   a rotor rotatably mounted with respect to the stator, including an impeller and a rotor magnet attached to the impeller, the rotor magnet being for having a magnetic interaction with the stator so that the rotor can have a rotation relative to the stator; and
   an induction coil mounted to the stator and electrically connected with the control circuit;
   wherein when the rotor rotates, the induction coil is capable of outputting a signal to the control circuit and in response to the signal, the control circuit is capable of changing a direction of the current for energizing the stator coil;
   wherein the control circuit is mounted on a printed circuit board and the printed circuit board is disposed separately from the motor.

5. The electrical fan of claim 4, wherein the control circuit is mounted on a motherboard of a computer system.

6. The electrical fan of claim 4, wherein the stator core has a plurality of extension arms extending from a central portion thereof, the stator coil is wound around the extension arms and the induction coil is wound around one of the extension arms.

7. The electrical fan of claim 4, wherein the stator core has a plurality of extension arms extending from a central portion thereof, the induction coil is wound around one of the extension arm and the stator coil is wound around the other extension arms other than the extension arm on which the induction coil is wound.

8. A brushless motor comprising:
   a stator;
   a stator coil wound around the stator;
   an induction coil being wound around the stator for outputting a voltage indicating a position of the rotor relative to the stator upon being induced by the magnet of the rotor;
   wherein the induction coil is capable of outputting a signal to the control circuit and in response to the signal, the control circuit is capable of changing a direction of the current in the stator coil; and
   wherein the stator coil is electrically connected to a control circuit on a printed circuit board for energizing the stator coil, the printed circuit board being located outside the motor.

9. The brushless motor of claim 8, wherein the stator has a plurality of arms extending from a central portion thereof, the arms are evenly spaced from each other, the stator coil is wounded to all of the arms while the induction coil is wound to one of the arms.

10. The brushless motor of claim 8, wherein the stator has a plurality of first arms and a second arm extending from a central portion thereof, the first arms are evenly spaced from each other, the stator coil is wounded to all of the first arms, the second arm is located between two of the first arms, and the induction coil is wound around the second arm.

* * * * *